(12) United States Patent
Ogura et al.

(10) Patent No.: US 7,099,031 B2
(45) Date of Patent: Aug. 29, 2006

(54) PRINTING SYSTEM USING A NETWORK COMPRISING A SERVER AND A PLURALITY OF PRINTING TERMINALS CONNECTED BY THE NETWORK

(75) Inventors: Kazuhiro Ogura, Yokohama (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 712 days.

(21) Appl. No.: 10/188,833

(22) Filed: Jul. 5, 2002

(65) Prior Publication Data
US 2004/0004736 A1    Jan. 8, 2004

(51) Int. Cl.
G06F 3/12 (2006.01)
G06K 15/00 (2006.01)

(52) U.S. Cl. .................. 358/1.15; 358/1.14
(58) Field of Classification Search ........ 358/1.1–1.18; 704/102, 103, 223, 224, 228, 229, 230, 232; 710/7, 8, 9, 10, 19, 33, 34, 46
See application file for complete search history.

(56) References Cited

U.S. PATENT DOCUMENTS 6,947,157 B1 *  9/2005  Fujita ................... 358/1.15
6,980,319 B1 * 12/2005  Ohta .................... 358/1.18

FOREIGN PATENT DOCUMENTS

| JP | 10-254655 A | 9/1998 |
|----|-------------|--------|
| JP | 2000-232551 A | 8/2000 |

* cited by examiner

*Primary Examiner*—Douglas Q. Tran
(74) *Attorney, Agent, or Firm*—Foley & Lardner LLP (57) ABSTRACT

A printing terminal connected to a network includes a display section to display a printing instruction or information, a transmitting/receiving section to transmit/receive information to/from a server, and a print processing section to print out printing data in accordance with the printing instruction. The server connected to the network includes a display forming section to generate information which is to be displayed on the display section of the printing terminal, a display processing section to process information which is to be displayed on the display unit of the printing terminal, and a printing data storage section to store the printing data which are to be printed out to the print processing section of the printing terminal.

19 Claims, 5 Drawing Sheets

| ID | PRINTING TERMINAL NAME | BOTH SIDES PRINT | COLOR PRINT | 2 IN 1 | LOCATED PLACE |
|---|---|---|---|---|---|
| 1 | PRINTER A | POSSIBLE | POSSIBLE | IMPOSSIBLE | ○○CITY○○TOWN… |
| 2 | PRINTER B | POSSIBLE | IMPOSSIBLE | POSSIBLE | ○○CITY○○TOWN;… |
| 3 | PRINTER C | IMPOSSIBLE | POSSIBLE | IMPOSSIBLE | ○○CITY○○TOWN… |
| ⋮ | ⋮ | ⋮ | ⋮ | ⋮ | ⋮ |

PRINTING SYSTEM USING A NETWORK COMPRISING A SERVER AND A PLURALITY OF PRINTING TERMINALS CONNECTED BY THE NETWORK

BACKGROUND OF THE INVENTION

1. Field of the Invention

The present invention relates to a printing system and a printing method using a network to which a server and plural printing terminals are connected.

2. Description of the Related Art

There is some printing system using a network, which prints contents of a multimedia terminal etc., distributes and sell the printed contents, for example.

The printing system of this kind, for example, locates printing terminals at convenience stores, railroad stations, and the like to supply the contents.

In addition, the printing system of this kind, for example, locates printing terminals at specific stores and supplies the contents as part of sales promotion or customer services.

The most updated information is always required for the contents dealt by such a printing system.

Therefore, each printing terminal is connected to a server via the network, and the contents are managed by the server.

A user who prints, operates an operation screen display unit provided in the printing terminal to specify a printing object.

When the printing object is specified, the printing terminal requests the server to download printing data. Then, when the printing data are downloaded from the server, the printing terminal prints the downloaded printing data on paper.

In the case where printing data has already been in the printing terminal, the terminal does not request downloading. In this case, the printing terminal prints the internal printing data on paper.

In regard to the printing system of this kind, known is a system capable of remotely performing the operation. For example, such a system has been disclosed in the Jpn. Pat. Appln. KOKAI Publication No. 2000-232551, and No. 10-254655, etc.

The Jpn. Pat. Appln. KOKAI Publication No. 2000-232551 provides a system in which client terminals and a server are connected to a network. In this system, printers and scanners are directly connected to the server.

In this system, when a user inputs an instruction to start copying through any one of the client terminals, an instruction to execute a copy operation is given to the server. Then, the printer and the scanner work to execute the copy operation.

In the Jpn. Pat. Appln. KOKAI Publication No. 10-254655, image data are transmitted to an image forming apparatus from any one of terminals via a communication circuit. The Jpn. Pat. Appln. KOKAI Publication No. 10-254655 provides a system in that, when the image data are output by the image forming apparatus, the output image is read through the scanner and displayed on a homepage.

This system is configured such that the output result of the image data can be checked by viewing the homepage through the terminal.

By the way, the printing system using a network has been desired such that design of a display unit can be frequently updated and a display information process corresponding new printing contents can be frequently newly added so as to always attract the user's interest.

However, a conventional printing system has generated display information to be displayed on a display unit of each printing terminal and executed a display process in the printing terminal.

When a service provider updates information including the design of the display unit, or newly adds a display information process corresponding to new printing contents, each printing terminal requires the updating process, which results in a heavy workload.

BRIEF SUMMARY OF THE INVENTION

An object of the present invention is to reduce a workload of the service provider for updating the design of a display unit in each of printing terminals, or newly adds a display information process.

The present invention is a printing system connecting a server and plural printing terminals to a network, wherein each printing terminal includes: a display unit configured to display a printing instruction or information; a transmitting/receiving section configured to transmit/receive information to/from the server via the network; and a print processing section configured to print out printing data in accordance with the printing instruction. In addition, the server includes: a display forming section configured to generate information to be displayed on the display unit of each printing terminal; a display processing section configured to process the information to be displayed on the display section of each printing terminal; and a printing data storage section configured to store the printing data for the print processing section of each of the printing terminals to print out.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 1:
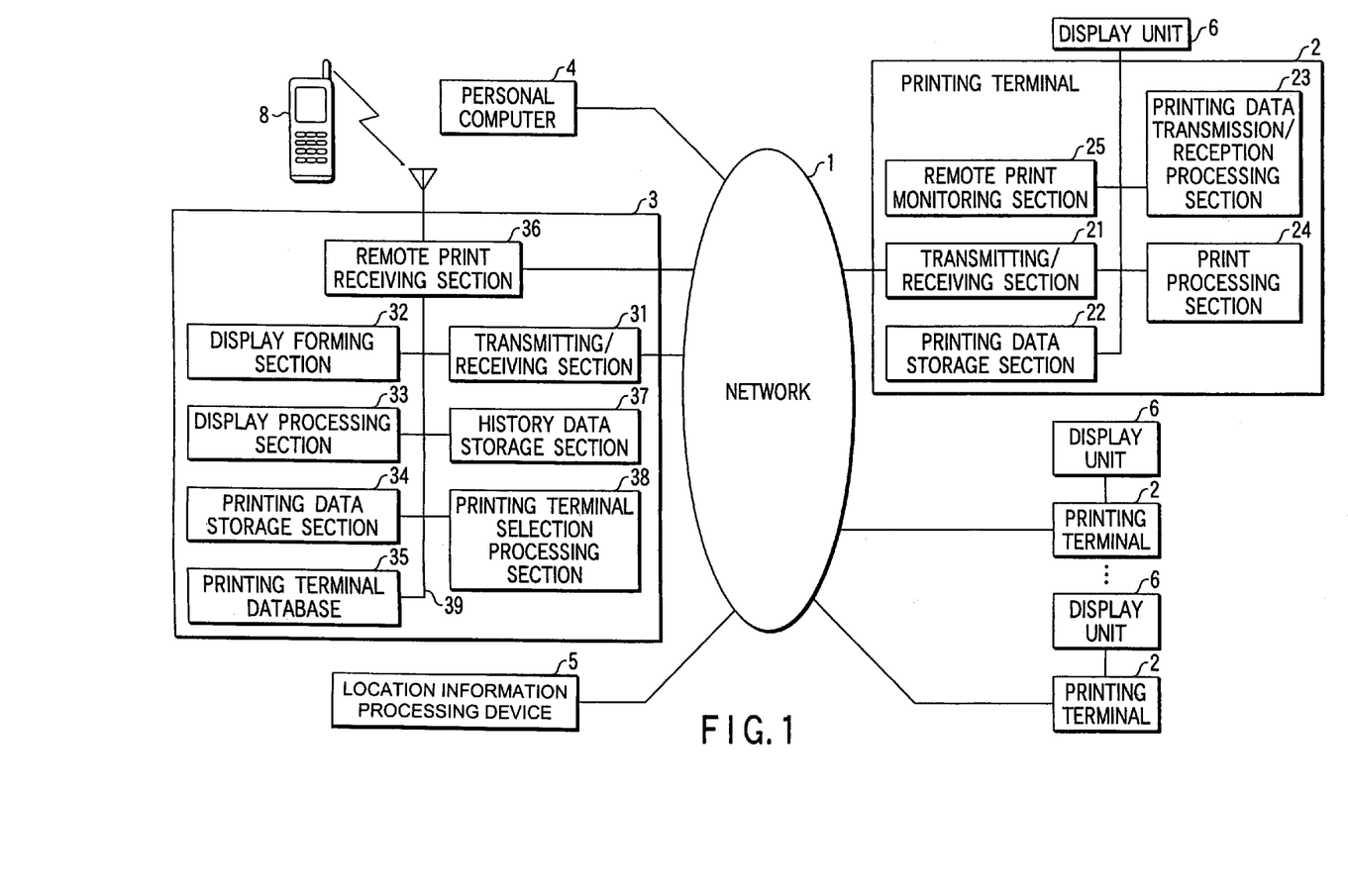
FIG. 1 is a block diagram showing an embodiment of a network printing system.

FIG. 1 shows an embodiment of a network printing system.

The network printing system connects plural printing terminals 2, a server 3, a personal computer 4, and a location information processing device 5, etc. to a network 1.

The location information processing device 5 stores location information about a place, where each of the printing terminals 2 is located, and map information surrounding the place.

Each of the printing terminals 2 connects a display unit 6 having an operation screen with a touch panel disposed on a display screen. The display unit 6 is configured to display information and instructions to print.

In each printing terminal 2 are included transmitting/receiving section 21, a printing data storage section 22, a printing data transmission/reception processing section 23, a print processing section 24, a remote print monitoring section 25 in its inside. The transmitting/receiving section 21, the printing data transmission/reception processing section 23, the remote print monitoring section 25 and the display unit 6 are electrically connected to each other through a bus line 26.

The printing data storage section 22 is electrically connected to the transmitting/receiving section 21. The print processing section 24 is electrically connected to the printing data transmission/reception processing section 23.

The transmitting/receiving section 21 is configured to transmit/receive information such as data, signals, etc. to/from the server 3 via the network 1. Further, the transmitting/receiving section 21 is configured to store the printing data received from the server 3 in the printing data storage section 22.

The printing data transmission/reception processing section 23 is configured to perform a transmission/reception process of the printing data to/from the server 3 through the transmitting/receiving section 21, and to perform a transmission/reception process of the printing data to/from the print processing section 24.

Figure 2:
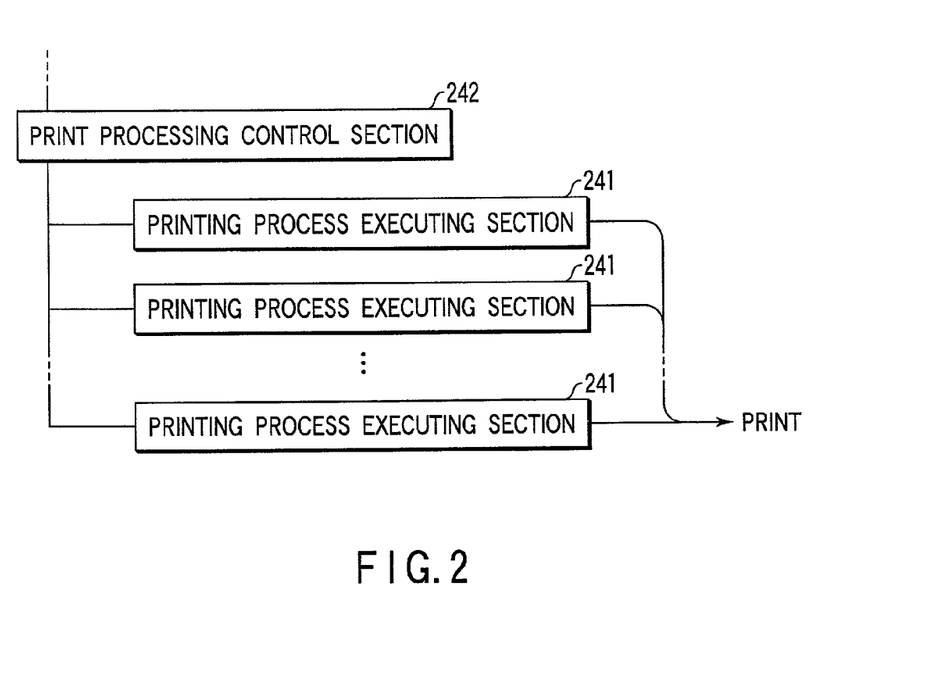
FIG. 2 is a block diagram showing a configuration of a print processing section in the embodiment.

As shown in FIG. 2, the print processing section 24 is constituted by plural printing process executing sections 241, each of the sections being configured to execute a printing process of the printing data, and a printing process control section 242, which is configured to control a printing process of each printing process executing section 241.

The configuration is capable of processing plural pieces of data in parallel by plural printing process execution processes in the print processing section 24. Then, printing on paper is carried out in a sequential order of the printing data that have finished printing process.

The remote print monitoring section 25 is configured to regularly monitor the presence/absence of a remote printing instruction to the server 3 from a distant place.

The server 3 comprises a transmitting/receiving section 31, a display forming section 32, a display processing section 33, a printing data storage section 34, a printing terminal database 35, a remote print receiving section 36, a history data storage section 37, and a printing terminal selection processing section 38.

The transmitting/receiving section 31, the display forming section 32, the display processing section 33, the printing data storage section 34, the printing terminal database 35, the remote print receiving section 36, the history data storage section 37, and the printing terminal selection processing section 38 are electrically connected to each other through a bus line 39.

The transmitting/receiving section 31 is configured to transmit/receive information such as data, signals, etc. to/from the transmitting/receiving section 21 of each printing terminal 2 via the network 1.

The display forming section 32 is configured to generate information to be displayed on the display unit 6 of each printing terminal 2.

The display processing section 33 is configured to process the information to be displayed on the display unit 6 of each printing terminal 2.

The printing data storage section 34 stores various pieces of printing data.

The history data storage section 37 is configured to store history data indicating which printing terminal 2 was used in the past by a portable terminal 8 such as a mobile telephone and PDA (Personal Digital Assistants), or the personal computer 4. For example, when some printing terminal 2 is selected and specified by the printing instruction from the portable terminal 8 and then operated, the relation between the portable terminal 8 and the printing terminal 2 at that time becomes history data.

Figure 4:
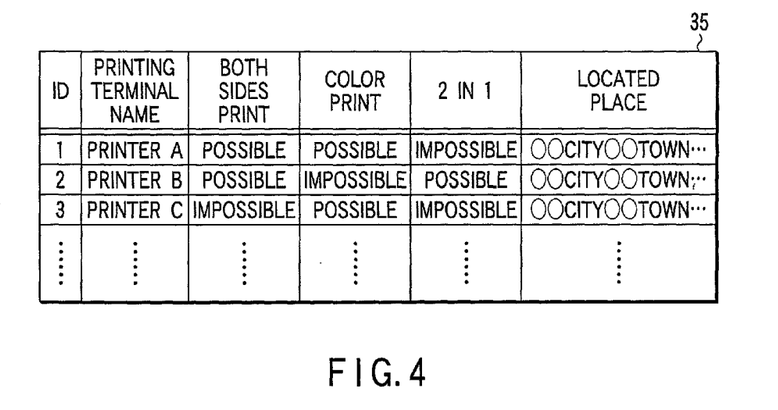
FIG. 4 is a diagram showing a configuration of a printing terminal database of a server in the embodiment.

As shown in FIG. 4, the printing terminal database 35 stores an ID (Identification) and a name of each printing terminal connected to the network 1, in addition to those, a located address of each printing terminal connected to the network 1, and information on printing options such as propriety of both sides printing, propriety of color printing, propriety of 2 in 1 printing, and the like.

The remote print receiving section 36 is configured to directly receive the printing instruction from the portable terminal 8 by radio, or to receive the instruction from a relay station via the network 1.

Further, the remote print receiving section 36 is configured to receive the printing instruction from the personal computer 4 via the network 1.

Accordingly, the remote print monitoring section 25 of each printing terminal 2 monitors regularly whether or not the remote print receiving section 36 has received the printing instruction from the portable terminal 8 or the personal computer 4.

The transmitting/receiving section 31 of the server 3 has a function of receiving E-mails. When receiving an E-mail through the transmitting/receiving section 31 via the network 1, the server 3 stores the E-mail in the printing data storage section 34.

At that time, if there is an attached file with the E-mail, the server 3 stores both body text of the E-mail and the attached file in the printing data storage section 34. Incidentally, the body text includes pieces of information on a title, a sender, and data & time, etc.

When receiving the request of the printing data from the printing terminal 2, the server 3 transmits the body text of the E-mail and the attached file, both the text and the file being stored in the printing data storage section 34, to the printing terminal 2 that made the request.

When receiving the body text of the E-mail and the attached file from the server 3, the relevant printing terminal 2 supplies the text and the file to the printing data transmission/reception processing section 23 and the display unit 6, and displays the text and the file on the display unit 6.

Then, the printing terminal 2 outputs the body text of the E-mail and the attached file from the printing data transmission/reception processing section 23 to the print processing section 24, to print the text and the file on paper.

When the portable terminal 8 or the personal computer 4 instructs the server 3 to print through a remote control, the name of each printing terminal connected to the network 1 is read from the printing terminal database of the server 3 and transmitted to the portable terminal 8 or the personal computer 4.

Figure 3:
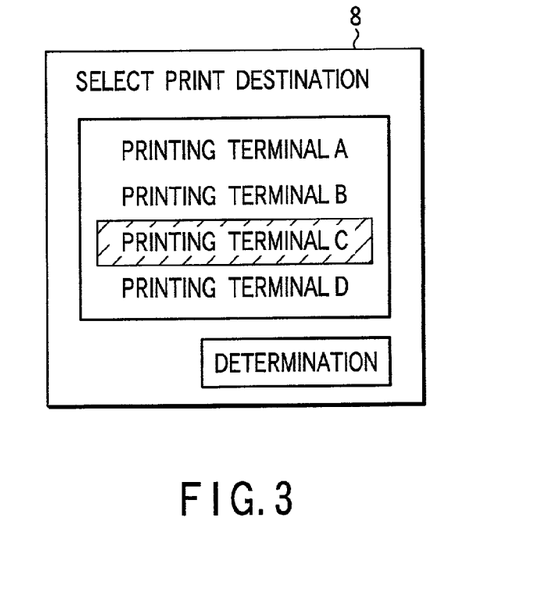
FIG. 3 is a diagram showing a display example of a portable terminal in the embodiment.

As for the portable terminal 8 or the personal computer 4, when receiving the names of the respective printing terminals from the server 3, for example, the portable terminal 8 displays the names on a display screen as shown in FIG. 3. The portable terminal 8 is configured to enable the selection and the specification of the printing terminal, whose printing data are desired to be printed out, on the display screen.

Incidentally, the portable terminal 8 can also select the printing terminal on the display screen and check information on printing options of the printing terminal and its address of the located place. In this case, the server 3 reads the information on printing options and the address of the located place of the printing terminal from the printing terminal database 35, and transmits the information and the address to the portable terminal 8.

The printing terminal selection processing section 38 is configured to select the printing terminal to be transmitted to the portable terminal 8.

For example, the names of the respective printing terminals are displayed on the display screen of the portable terminal 8. In this state, the location specification is requested from the portable terminal 8. Then, the printing terminal selection processing section 38 selects the printing terminal disposed at a location near the portable terminal, based on the current location information on the portable terminal 8 and the location information on the respective printing terminals 2 from the location information processing device 5, and transmits the selected printing terminal to the portable terminal 8.

Thus, some names of the printing terminals disposed at the location near the current location of the portable terminal are displayed on the display screen of the portable terminal 8.

Further, the names of the respective printing terminals are displayed on the display screen of the portable terminal 8. In this state, the history specification is requested from the portable terminal 8. Then, the printing terminal selection processing section 38 selects the printing terminal 2, which has frequently been used in the past by the portable terminal 8, from the history data stored in the history data storage section 37, and transmits it to the portable terminal 8.

Therefore, the name of the printing terminal, which was often used in the past, is displayed on the display screen of the portable terminal 8.

In addition, when selecting the printing terminal 2 to be used on the display screen of the portable terminal 8, the printing terminal selection processing section 38 receives map information on the corresponding printing terminal 2 from the location information processing device 5, and transmits it to the portable terminal 8.

Figure 5:
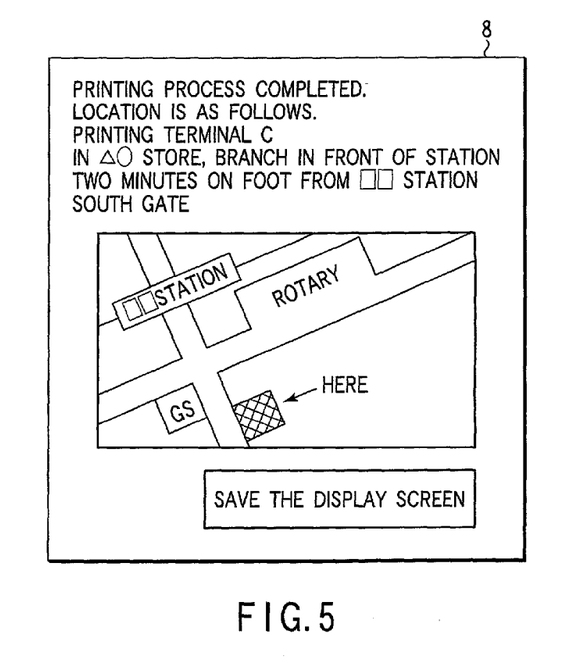
FIG. 5 is a diagram showing a display example of the portable terminal in the embodiment.

Therefore, as shown in FIG. 5, a map for guiding a route together with a guide message to the place where the selected printing terminal is located is displayed on the display screen of the portable terminal 8.

Incidentally, in the above description, a display operation on the display screen of the portable terminal 8 has been described. The same display operation is carried out similarly on the display screen of the personal computer 4.

Figure 6:
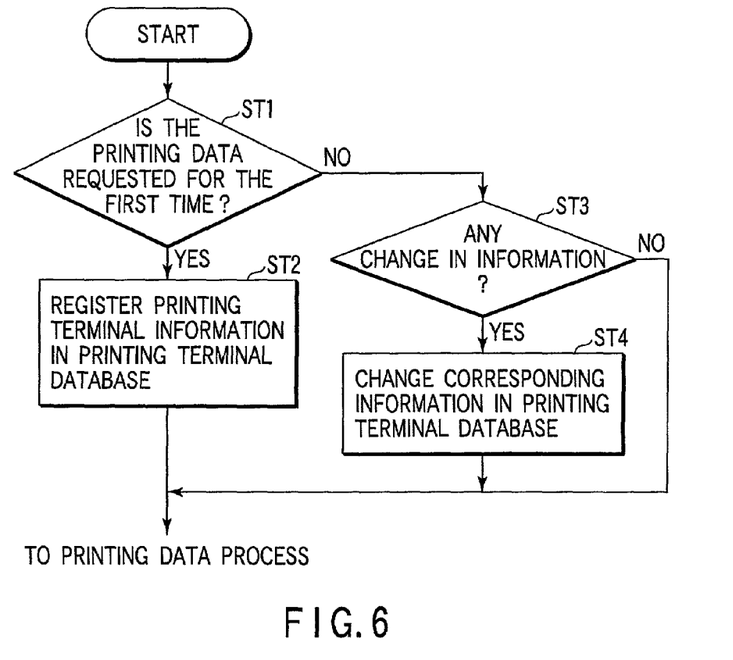
FIG. 6 is a flow chart showing a part of a process in the server when receiving a request of printing data from the printing terminal in the embodiment.

When receiving the request of the printing data from any one of the printing terminals 2, the server 3 performs a process shown in the flow chart in FIG. 6. In this process, information on each printing terminal 2 to the printing terminal database 35, namely, the ID and the name of the printing terminal, information on printing options, and the address of the located place of the printing terminal are newly registered or changed.

That is, when receiving the request of the printing data from the printing terminal 2, the server 3 determines whether or not the request is given for the first time in the Step ST1.

If the request is the first one, the server 3 newly registers the ID and the name of the printing terminal 2, the information on printing options, and the address of the located place in the printing terminal database 35 in the Step ST2.

If the request of the printing data from the printing terminal 2 is the one on and after the second time, the server 3 determines whether or not the information on the relevant printing terminal 2 has been changed in the Step ST3.

When the information has been changed, the server 3 changes the information on the printing terminal 2 in the printing terminal database 35 in the Step ST 4.

Figure 7:
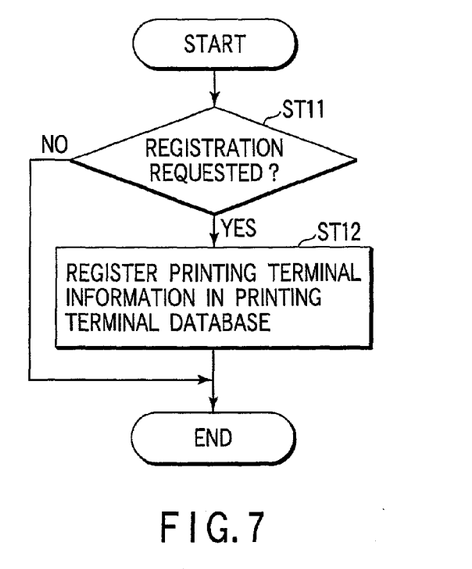
FIG. 7 is a flow chart showing a process performed by the server when receiving a registration request from the printing terminal in the embodiment.

Further, when receiving the request of the registration from the printing terminal 2, the server 3 performs a process shown the flow chart in FIG. 7. In this process, the ID and the name of the printing terminal, the information on printing options, and the address of the located place of the printing terminal are newly registered.

That is, the server 3 determines whether or not the request of the registration from the printing terminal 2 has been received in the Step ST11.

Then, when determining the reception of the registration request, the server 3 newly registers the ID and the name of the relevant printing terminal 2, the information on printing options, and the address of the located place of the printing terminal in the printing terminal database 35 in the Step ST 12.

In the system according to the embodiment, a user inputs a printing instruction by operating the touch panel of the display unit 6 of the printing terminal 2. The input printing instruction is transmitted from the transmitting/receiving section 21 to the server 3 via the network 1.

When receiving the printing instruction from the printing terminal 2 through the transmitting/receiving section 31, the server 3 drives the display forming section 32 to generate display information, and further drives the display processing section 33 to carry out a display process. Then, the server 3 transmits the generated display information from the transmitting/receiving section 31 to the printing terminal 2 that has transmitted the printing instruction via the network 1. When receiving the display information from the server 3, the printing terminal 2 outputs the information to the display unit 6 and displays it.

In the system, the generation of the information to be displayed on the display unit 6 of the printing terminal 2 and the display process are carried out by the display forming section 32 and the display processing section 33, both of which being included in the server 3. That is the same one as the Web browsing of the Internet that has been prevailed.

Therefore, all information for displaying is generated by the server 3 and transmitted to the printing terminal 2. The operation performed by the printing terminal 2 is notified to the server 3, and processed in the server 3.

Accordingly, in the system, the service provider can carry out all operations of update pertaining to display and adding work through the server 3. By carrying out the operations of update pertaining to display and adding work in the server 3, the service provider can reflect the update and the addition on all the printing terminals 2 connected to the network 1. Therefore, the operation load of the service provider is reduced.

Further, in the system according to the embodiment, the printing data transmission/reception processing section 23 is disposed in each printing terminal 2. Therefore, a transmission/reception process of the printing data can be performed in each printing terminal 2.

That is, each printing terminal 2 does not notify only the final printing instruction to the server 3, but notify it to the printing data transmission/reception processing section 23 among processes to the user's operations performed in the display unit 6.

When receiving the notification of the printing instruction, the printing data transmission/reception processing section 23 performs a communication process such as downloading the printing data from the server 3 if necessary, and further hands over the process to the print processing section 24 so as to print on paper. All the communication processes at this time are performed at the initiative of the printing terminal 2. That is, the process is performed in the system such that the server 3 responds to the request from the printing terminal 2.

Therefore, the system can be operated over the firewall. For example, in a network in a company, which is protected by the firewall, it is possible to access outward from the network in the firewall as usual. However, the access to the network in the firewall from outside of the firewall is limited.

In the system, all the communication processes are performed at the initiative of the printing terminal 2, even in the network circumstance protected by the firewall. Therefore, if each printing terminal 2 is disposed in the firewall and the server 3 is disposed outside of the firewall, an operation over the firewall can be realized easily.

In addition, each printing terminal 2 comprises the printing data transmission/reception processing section 23, so that the printing data can be individually set or controlled for each printing terminal. As described above, since the printing data transmission/reception processing section 23 controls finely each printing terminal, various kinds of printing terminals can be used.

Further, in the system according to the embodiment, the user can remotely operate the printing terminals 2 from a distant place with use of the portable terminal 8 or the personal computer 4. That is, when the user transmits a printing instruction through the portable terminal 8 or the personal computer 4, the remote print receiving section 36 of the server 3 receives the printing instruction.

On the other hand, each printing terminal 2 inquires the presence/absence of the printing instruction regularly to the remote print receiving section 36 through the remote print monitoring section 25. When the printing terminal 2 recognizes the printing instruction transmitted to itself, it transmits information from the remote print monitoring section 25 to the printing data transmission/reception processing section 23.

The following process by the printing data transmission/reception processing section 23 is a printing process led by the printing terminal in the same manner as the case where the printing instruction is input through the display unit 6.

As described above, in the case of instructions from a distant to print, the user always only has to access the server 3 even for the case where the user instructs any one of the printing terminals to print, so that a procedure of the process becomes easy.

For the case where the portable terminal 8 or the personal computer 4 gives instruction to print from a distant place, the terminal 8 or the computer 4 receives the names of the respective printing terminals connected to the network 1 from the server 3 and displays them on the display screen. Therefore, the portable terminal 8 or the personal computer 4 can select one of the printing terminals to which the printing instruction is transmitted, on the display screen.

In this case, the portable terminal 8 or the personal computer 4 can receive the information on printing options and the address of the located place of the selected printing terminal from the server 3 and display the received information and address on the display screen. Therefore, the user can select the printing terminal having printing options which the user desires, and recognize the located place of the printing terminal.

In addition, when requesting a location specification to the server 3, the portable terminal 8 or the personal computer 4 receives the names of the printing terminals located near the located place of itself, and displays the names on the display screen. Therefore, the user can select the printing terminal that is located nearest from the user.

In the case where a large number of printing terminals 2 are connected to the Internet 1, an operation of selecting the printing terminal becomes complicated. However, the names of the printing terminals located at the near place are displayed on the display screen in preference to the others in the manner as described above. Therefore, the user can easily select the printing terminal.

In addition, when requesting a history specification to the server 3, the portable terminal 8 or the personal computer 4 receives the names of the printing terminals which has frequently been used in the past by itself, and displays the names on the display screen. Therefore, the user can cause the printing terminal, which is frequently used by the user to print.

That is, the user uses the printing terminal 2 that he or she knows well, which improves security.

Further, when having selected the printing terminal 2 to use, the portable terminal 8 or the personal computer 4 receives the map information on the corresponding printing terminal 2 from the server 3, and displays the information on the display screen. Therefore, the user can easily reach the located place of the printing terminal 2.

Furthermore, in the system according to the embodiment, the print processing section 24 of each printing terminal 2 has plural printing process executing sections 241, so that plural pieces of printing data can be processed in parallel with use of the printing process executing sections 241, respectively.

Therefore, even the printing instructions from the display unit 6, the portable terminal 8 and the personal computer 4 are given to the single printing terminal 2 at the same time, the printing terminal 2 performs printing processes of the respective pieces of instructed printing data by the respective printing process executing sections 241 in parallel. Then, the printing terminal 2 prints the printing data on paper in the sequential order of the pieces of printing data whose printing process have been completed.

Therefore, in comparison with the case where a piece of the printing data is processed and printed first and then a process of the following piece of the printing data is started, the waiting time can be shortened and thus print can be carried out smoothly.

Next, an operation at the time when the server 3 receives an E-mail through the Internet 1 will be described.

In general, a file attached to an E-mail is mainly used on purpose to supplement the contents of the E-mail body text. At this time, the attached file makes no sense when given solely, but the combination with the body text of the mail provides valued information.

Therefore, when receiving an E-mail, the server 3 stores the body text information of the E-mail in the printing data storage section 34 together with the attached file at the same time.

Figure 8:
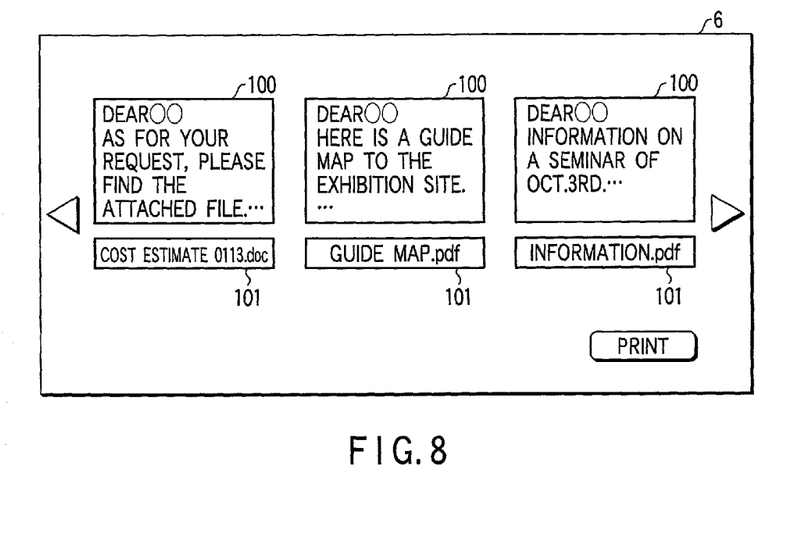
FIG. 8 is a diagram showing a display example when the printing terminal receives an E-mail with an attached file in the embodiment.

When the text to be printed by the printing terminal 2 is selected, the printing terminal 2 displays body text information 100 and attached file information 101 on the display unit 6 on the set as shown in FIG. 8.

Accordingly, when an item to be printed is selected on the display screen of the display unit 6, it becomes unfailing and easy to select the attached file, whose contents are difficult to be judged with only its title.

Figure 9A:
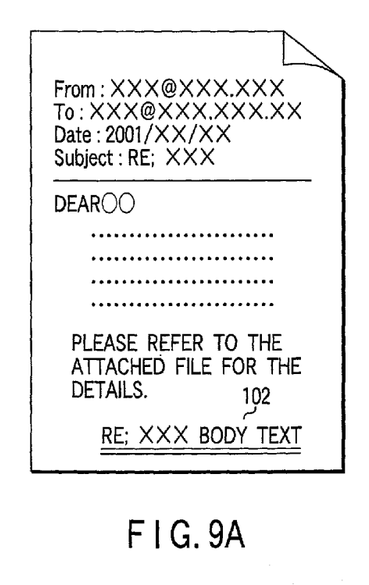
FIGS. 9A and 9B are diagrams showing print examples when the printing terminal receives an E-mail with an attached file in the embodiment.
Figure 9B:
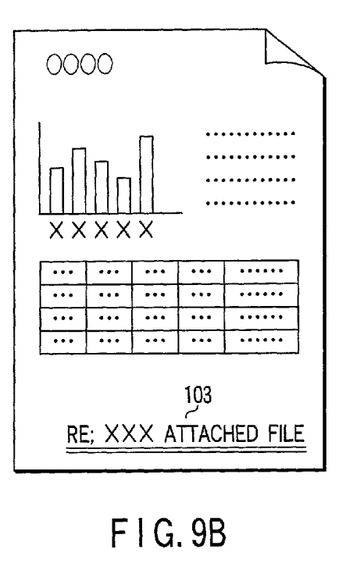

Then, in accordance with the printing instruction from the display unit 6, the print processing section 24 prints the body text of the E-mail as shown in FIG. 9A, and prints the attached file as shown in FIG. 9B.

At that time, so as to make the relation between the text and the attached file clear, the print processing section 24 creates a part of the text such as a header, or footer, etc. common to both the text and the attached file, and prints it as shown with the numerals 102, and 103 in FIGS. 9A and 9B.

Thus, in the printed materials, the relation between the text and the attached file becomes clear. Accordingly, the user can understand the contents unfailingly after printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printing system using a network, comprising a server and a plurality of printing terminals connected by the network,
   said plurality of printing terminals each comprising:
   a display unit configured to receive and display information to be displayed from the server;
   a transmitting/receiving section configured to transmit a printing instruction and a printing data request to the server via the network, and receive the information to be displayed and printing data information from the server via the network;
   a printing data storage section configured to store printing data received by the transmitting/receiving section;
   a print processing section configured to print out the printing data; and
   a printing data transmission/reception processing section configured to process the printing data downloaded from the server via the transmitting/receiving section, and transmit the printing data to the print processing section, and
   the server comprising:
   a display forming section configured to generate information to be displayed on the display section of each of the printing terminals to which a printing instruction has been transmitted;
   a display processing section configured to process the information to be displayed, generated by the display forming section, according to a display format;
   a printing data storage section configured to store the printing data that is to be printed by the printing processing section of each of the printing terminals; and
   a transmitting/receiving section configured to receive a printing instruction from each of the printing terminals via the network, and to transmit the information to be displayed and the printing data stored in the printing data storage section to the printing terminal from which the printing instruction has been transmitted.

2. The printing system using the network according to claim 1,
   wherein the server further comprises a remote print receiving section configured to receive an external remote printing instruction;
   each of the printing terminals further comprises a remote print monitoring section configured to inquire the presence/absence of a remote printing instruction to the server, determines the printing instruction received by the remote print receiving section, and notify the printing data transmission/reception processing section of the printing instruction; and
   the printing data transmission/reception processing section requests download of the printing data from the server on being notified of the printing instructions from the remote print monitoring section.

3. The printing system using the network according to claim 2,
   wherein the server further comprises a printing terminal database configured to manage information regarding each of the printing terminals, and when a remote printing instruction is given externally, notifies the information regarding each of the printing terminals managed by the printing terminal database to an external member which carries out the remote printing instruction.

4. The printing system using the network according to claim 2, wherein
   the server further comprises a printing terminal database configured to manage printing option information of each of the printing terminals and when a remote printing instruction is given externally, notifies the printing option information of each of the printing terminals managed by the printing terminal database to an external member which carries out the remote printing instruction.

5. The printing system using the network according to claim 3, wherein the server further comprises a printing terminal selection processing section configured to receive location information from a location information processing device managing a located place of each of the printing information, and notifies the selected printing terminal to an external member which carries out the remote printing instruction.

6. The printing system using the network according to claim 3, wherein the server further comprises:
   a history data storage section configured to mange a usage history of the printing terminal which was used for printing in accordance with an external remote printing instruction fore each user; and
   a printing terminal selection processing section configured, when a remote printing instruction is given externally, to select the printing terminal which has been used in the past by a user who has performed the remote printing instruction from usage history information managed by the history data storage section, and notifies the selected printing terminal to an external member which carries out the remote printing instruction.

7. The printing system using the network according to claim 3, wherein the server, when receiving externally the selection of a printing terminal which performs a remote print, further receives map information on a route to a located place of the corresponding printing terminal from the location information processing device which manages the map information to guide to the located place of each of the printing terminals, and notifies the map information to a external member which carries out a remote printing instruction.

8. The printing system using the network according to claim 2, wherein the print processing section of each of the printing terminals has plural printing process executing sections, each of which executes a printing process of printing data in accordance with a printing instruction, and executes printing processes of the printing data in accordance with plural printing instructions by the respective printing process executing sections in parallel, before printing out the printing data sequentially.

9. The printing system using the network according to claim 2, wherein the server has a function of receiving an e-mail, the server stores the attached file in a printing data storage section together with body text of the e-mail as printing data, and, when receiving the request of the printing data from a printing terminal, reads the corresponding body text of the e-mail and the attached file from the printing data storage section and transmits the text and the file to the printing terminal, and each of the printing terminals, on receiving the body text of the e-mail and the attached file from the server, displays the text and the file on the display unit.

10. A printing system using a network, comprising a server and a plurality of printing terminals connected by the network, said plurality of printing terminals each comprising:
display means configured to receive and display information to be displayed from the server;
transmitting/receiving means configured to transmit a printing instruction and a printing data request to the server via the network, and receive the information to be displayed and printing data information from the server via the network;
printing data storage means configured to store printing data received by the transmitting/receiving means;
print processing means configured to print out the printing data; and
printing data transmission/reception processing means configured to process the printing data downloaded from the server via the transmitting/receiving means, and transmit the printing data to the print processing means, and the server comprising:
display forming means configured to generate information to be displayed on the display means of each of the printing terminals to which the printing instruction has been transmitted;
display processing means configured to process the information to be displayed generated by the display forming means according to a display format;
printing data storage means configured to store the printing data that is to be printed by the printing processing means of each of the printing terminals; and
transmitting/receiving means configured to receive a printing instruction from each of the printing terminals via the network, and to transmit the information to be displayed and the printing data stored in the printing data storage means to the printing terminal from which the printing instruction has been transmitted.

11. The printing system using the network according to claim 10,
wherein the server further comprises a remote print receiving means configured to receive an external remote printing instruction;
each of the printing terminals further comprises a remote print monitoring means configured to inquire the presence/absence of a remote printing instruction to the server, determine the printing instruction received by the remote print receiving section, and notify the printing data transmission/reception processing means of the printing instruction; and
the printing data transmission/reception processing means requests download of the printing data from the server on being notified of the printing instructions from the remote print monitoring means.

12. The printing system using the network according to claim 11,
wherein the server further comprises a printing terminal database means configured to manage information regarding each of the printing terminals, and when a remote printing instruction is given externally, notifies the information regarding each of the printing terminals managed by the printing terminal database means to an external member which carries out the remote printing instruction.

13. The printing system using the network according to claim 11, wherein the server further comprises a printing terminal database means configured to manage printing option information of each of the printing terminal, and when a remote printing instruction is given externally, notifies the printing option information of each of the printing terminals managed by the printing terminal database means to an external member which carries out the remote printing instruction.

14. The printing system using the network according to claim 12, wherein the server further comprises a printing terminal selection processing means configured to receive location information from a location information processing device managing a located place of each of the printing terminals at the time when a remote printing instruction is given externally and select the printing terminal near the place where the remote printing instruction is performed, and notify the selected printing terminal to an external member which carries out the remote printing instruction.

15. The printing system using the network according to 12, wherein
the server further comprises:
a history data storage means configured to manage a usage history of the printing terminal which was used for printing in accordance with an external remote printing instruction for each user; and
a printing terminal means processing section configured, when a remote printing instruction is given externally, to select the printing terminal which has been used in the past by a user who has performed the remote printing instruction this time from usage history information managed by the history data storage means, and notifies the selected printing terminal to an external member which carries out the remote printing instruction.

16. The printing system using the network according to claim 12, wherein the server, when receiving externally the selection of a printing terminal which performs a remote print, further receives map information on a route to a located place of the corresponding printing terminal from the location information processing device which manages the map information to guide to the located place of each of the printing terminals, and notifies the map information to an external member which carries out a remote printing instruction.

17. The printing system using the network according to claim 11, wherein the print processing means of each of the printing terminals has plural printing process executing means, each of which executes a printing process of printing data in accordance with a printing instruction, and executes printing processes of the printing data in accordance with plural printing instructions by the respective printing process executing means in parallel, before printing out the printing data sequentially.

18. The printing system using the network according to claim 11, wherein the server has a function of receiving an e-mail, and when an file is attached to the e-mail, the server stores the attached file in a printing data storage means together with body text of the e-mail as printing data, and, when receiving the request of the printing data from a printing terminal, reads the corresponding body text of the e-mail and the attached file from the printing data storage means and transmits the text and the file to the printing terminal, and each of the printing terminals, on receiving the body text of the e-mail and the attached file from the server, displays the text and the file on the display unit.

19. A printing system connecting a server and plural printing terminals to a network, wherein said plurality of printing terminals are each configured to:

receive and display information to be displayed from the server;

transmit a printing instruction and a printing data request to the server via the network;

receive the information to be displayed and printing data information from the server via the network;

store printing data received from the server; and print out the printing data downloaded from the server, and the server configured to:

generate information to be displayed on the display section of each of the printing terminals;

conform the generated information to be displayed to a display format;

store the printing data to be output to each of the plurality of printing terminals;

receive a printing instruction from each of the printing terminals via the network; and transmit the information to be displayed and the stored printing data to the printing terminal, from which the printing instruction has been transmitted, via the network.

* * * * *